United States Patent [19]
Bongi

[11] Patent Number: 5,461,479
[45] Date of Patent: Oct. 24, 1995

[54] METHOD FOR CONTROLLING THE LAYING OF A SILICONE STRING, PARTICULARLY BETWEEN THE CRANKCASE AND THE SUMP OF AN INTERNAL COMBUSTION ENGINE

[75] Inventor: Adolfo Bongi, Turion, Italy

[73] Assignee: Comau S.p.A., Grugliasco, Italy

[21] Appl. No.: 98,731

[22] Filed: Jul. 29, 1993

[30] Foreign Application Priority Data

Sep. 30, 1992 [IT] Italy .................... T092A0795

[51] Int. Cl.⁶ .................................. G01B 11/06
[52] U.S. Cl. .................. 356/381; 250/564; 901/47
[58] Field of Search .................. 356/381; 250/560; 901/47; 156/64

[56] References Cited

U.S. PATENT DOCUMENTS

| | | | |
|---|---|---|---|
| 3,878,652 | 4/1975 | Mosher | 214/1 CM |
| 4,192,612 | 3/1980 | Bodlaj | 356/381 |
| 4,201,475 | 5/1980 | Bodlaj | 356/381 |
| 4,212,534 | 7/1980 | Bodlaj | 356/381 |
| 4,280,137 | 7/1981 | Ashida et al. | 901/47 |
| 4,456,379 | 6/1984 | Schumann et al. | 356/381 |
| 4,616,121 | 10/1986 | Clocksin et al. | 901/47 |
| 4,650,333 | 3/1987 | Crabb et al. | 356/381 |
| 4,672,564 | 6/1987 | Egli et al. | 348/140 |
| 5,202,740 | 4/1993 | Kivits | 356/381 |
| 5,298,977 | 3/1994 | Shintani et al. | 356/381 |
| 5,321,353 | 6/1994 | Furness | 901/47 |

FOREIGN PATENT DOCUMENTS

| | | | |
|---|---|---|---|
| 63-314403 | 12/1988 | Japan | 356/152.2 |
| 1185406 | 7/1989 | Japan | 356/381 |

*Primary Examiner*—F. L. Evans
*Assistant Examiner*—Jason D. Eisenberg
*Attorney, Agent, or Firm*—Sughrue, Mion, Zinn, Macpeak & Seas

[57] ABSTRACT

The quality of the laying of a silicone string for sealing purposes, for example between the crankcase and the sump of an internal combustion engine is controlled by a robot carrying a laser-meter head for measuring distances by reflection.

1 Claim, 4 Drawing Sheets

METHOD FOR CONTROLLING THE LAYING OF A SILICONE STRING, PARTICULARLY BETWEEN THE CRANKCASE AND THE SUMP OF AN INTERNAL COMBUSTION ENGINE

BACKGROUND OF THE INVENTION

The present invention relates to a method for controlling the laying of a silicone string for sealing purposes between two elements, particularly between the crankcase and the sump of an internal combustion engine.

The method according to the invention is characterized in that it comprises the following steps:
- providing one of said two elements in a position for receiving a silicone string,
- providing a robot with a laser-meter head for measuring distances by reflection,
- laying a silicone string on said one of said two elements,
- controlling said robot so as to move said laser-meter head adjacent to the laying surface of the silicone string, causing said head to follow a predetermined path corresponding to a theorical configuration of said string,
- during said movement of said laser-meter head, processing output signals from said laser-meter head for continuously measuring the thickness of the silicone string as a difference between the distances of said laser head from said laying surface and the top of said string, and
- checking, during said measuring operation, whether the measured thickness of said string is comprised between a predetermined minimum and maximum value.

In a first embodiment, which will be described hereinafter with reference to FIG. 4, the crankcase of an internal combustion engine is positioned by locating means for insuring with great precision that said laying surface is in a predetermined position, so as to allow the following measuring operation.

In another embodiment, which will be described hereinafter with reference to FIG. 5, relating to the case in which the laying surface and the path of the robot lie on planes which are not parallel to each other, said laser-meter head is also used to determine the position in space of at least three points of the laying surface, so as to compute the position of such surface.

BRIEF DESCRIPTION OF THE DRAWINGS

The invention will now be described with reference to the annexed drawings, given purely by way of non limiting example, in which.

DETAILED DESCRIPTION OF THE INVENTION

Figure 1:
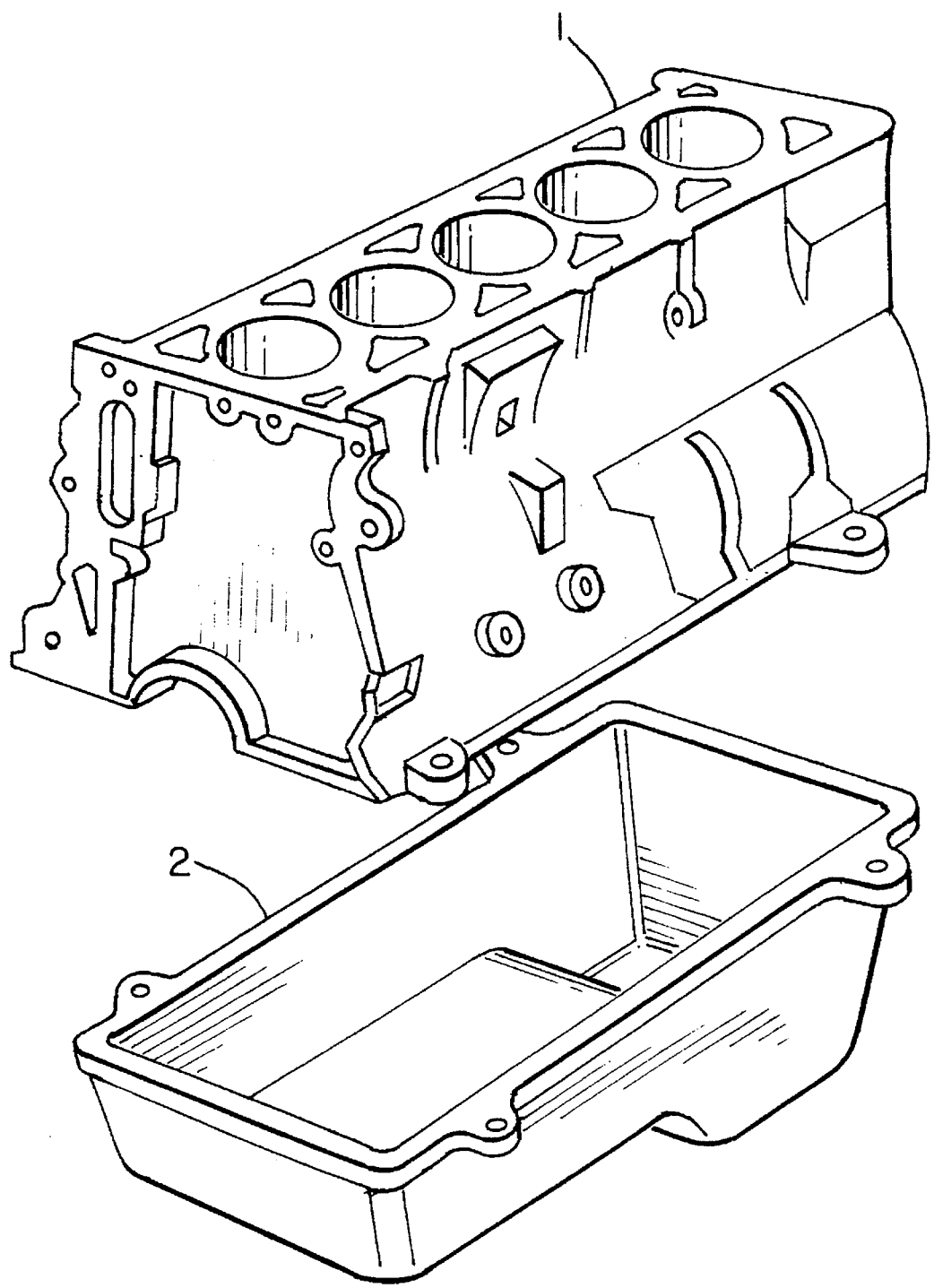
FIG. 1 shows a perspective diagrammatic view of a crankcase of an internal combustion engine, with the associated sump.
Figure 2:
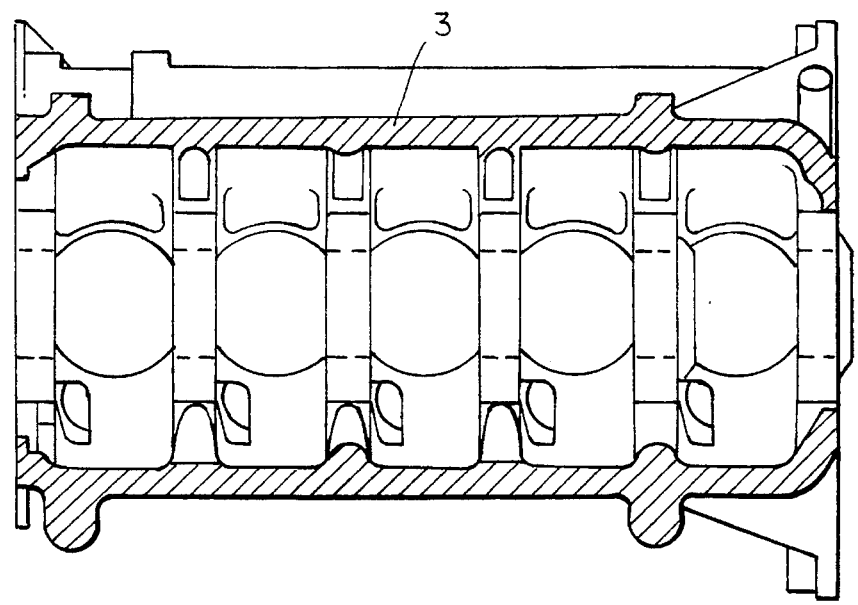
FIG. 2 is a plan bottom view of the crankcase of FIG. 1.

With reference to FIG. 1, reference numeral 1 designates the crankcase of an internal combustion engine provided with a sump 2. In lieu of the conventional sealing gasket, between said two elements there is interposed a silicone string which is laid on the lower surface of the crankcase 1. FIG. 2 shows said laying surface of the silicone string, designated by reference numeral 3.

Figure 3:
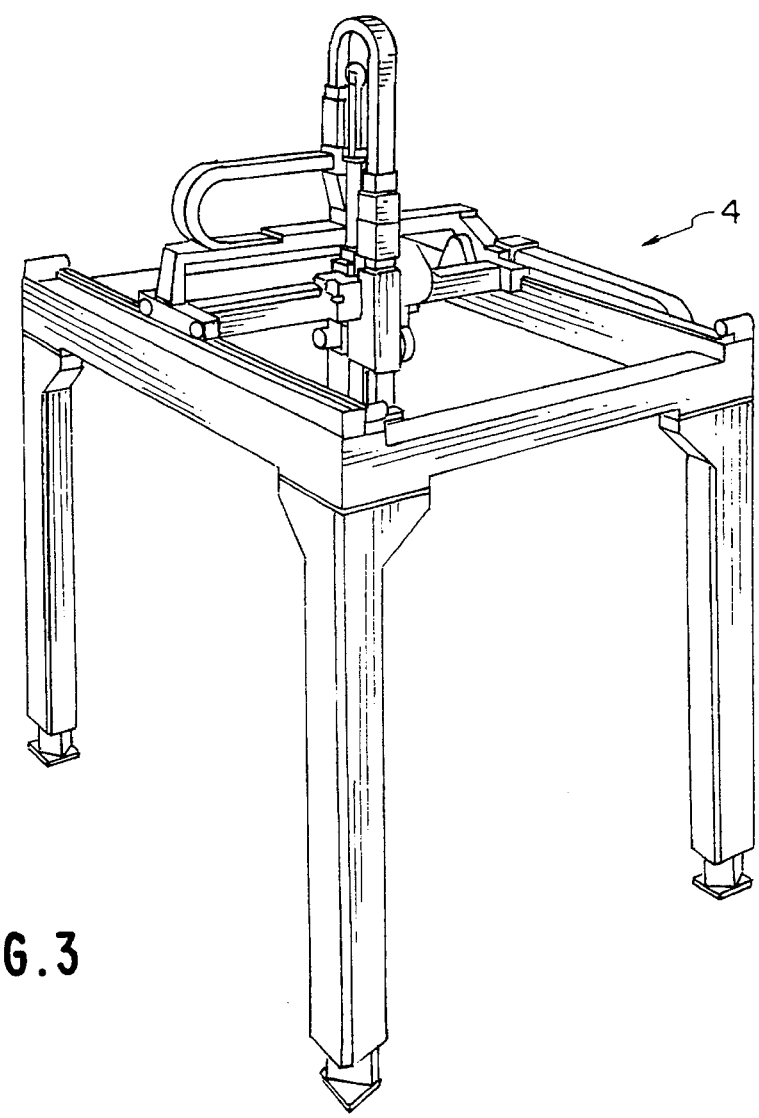
FIG. 3 is a diagrammatic view of a robot which may be used in the method according to the invention.

In FIG. 3, reference numeral 4 designates a robot of a cartesian type, presently marketed by the applicant, which can be used in the method according to the invention. The robot 4 is provided with a laser-meter head for measuring distance by reflection which is designated by reference numeral 5 in FIG. 4.

Figure 4:
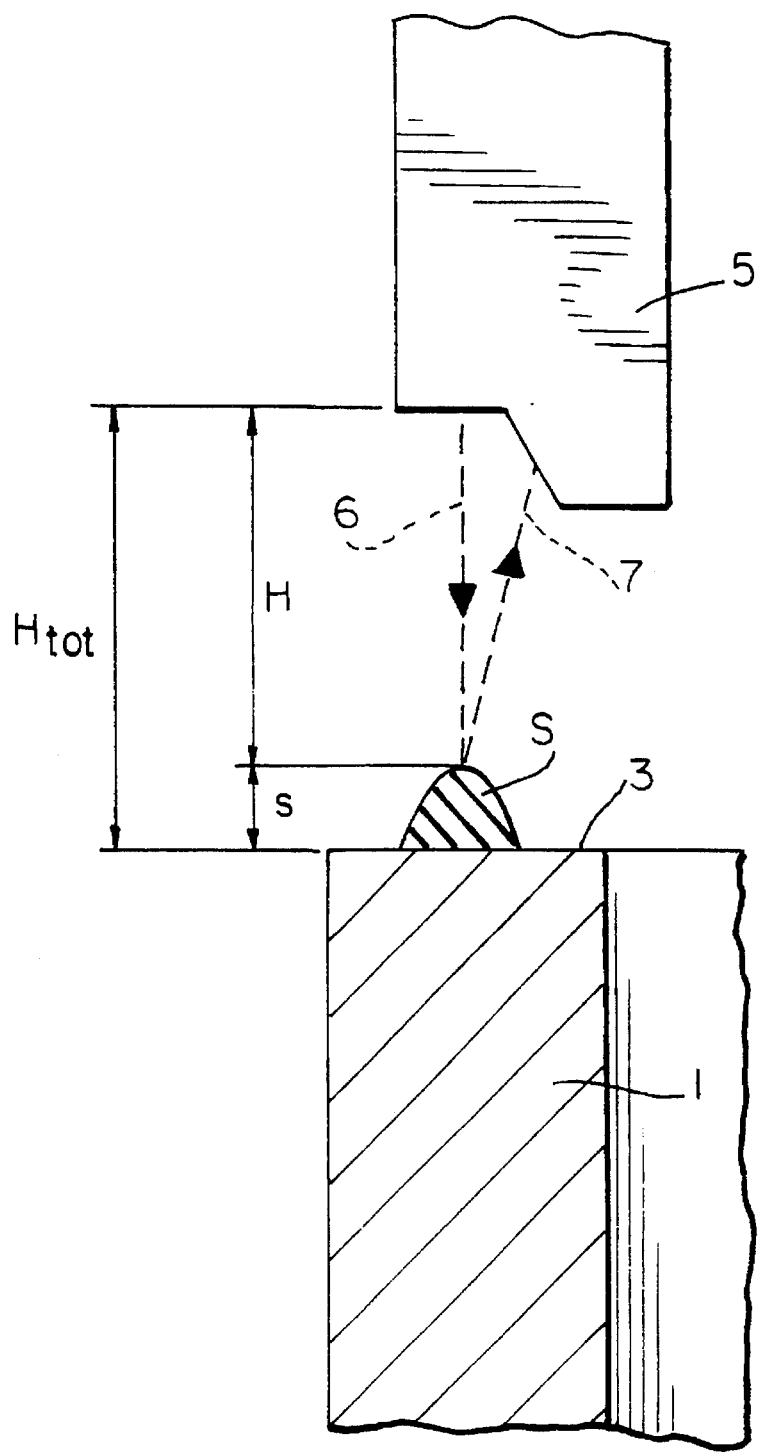
FIGS. 4, 5 show the basic principle of the method according to the invention as worked out in the two embodiments which have been mentioned above.

The construction details of the laser-meter head 5 are not illustrated since they can be of any known type and do not fall within the scope of the present invention. The same applies to the electronic means for processing the output signals from the laser-meter head in order to perform the requested measurements. According to the conventional technique in this field, the laser head 5 is able to emit a laser beam 6 towards an object and to receive a laser beam 7 reflected by the object. As a function of the time of response of beam 7, it is possible to determine with good approximation the distance of the laser head from the surface which reflects the laser beam. With reference to FIG. 4, the head 5 is moved by the robot 4 at a predetermined fixed distance $H_{tot}$ from the laying surface 3 having the silicone string S therein. The laser-meter head 5, while moving along surface 3, continuously determines the distance H between the head 5 and the top of the string S, so to enable computation by difference of thickness s of string S. Naturally, said measurement is approximate, but the precision is sufficient to check whether the determined value of thickness s is comprised between a minimum and a maximum acceptable value. The movement of the robot is driven so as to displace the laser head along a path corresponding to the theoretical configuration of the silicone string. Thus, it is possible to determine whether the silicone string has been laid along the desired path and whether, at each measured point, the quantity of silicone is comprised between a minimum and a maximum acceptable value; if it is out of such range, its value is determined.

Figure 5:
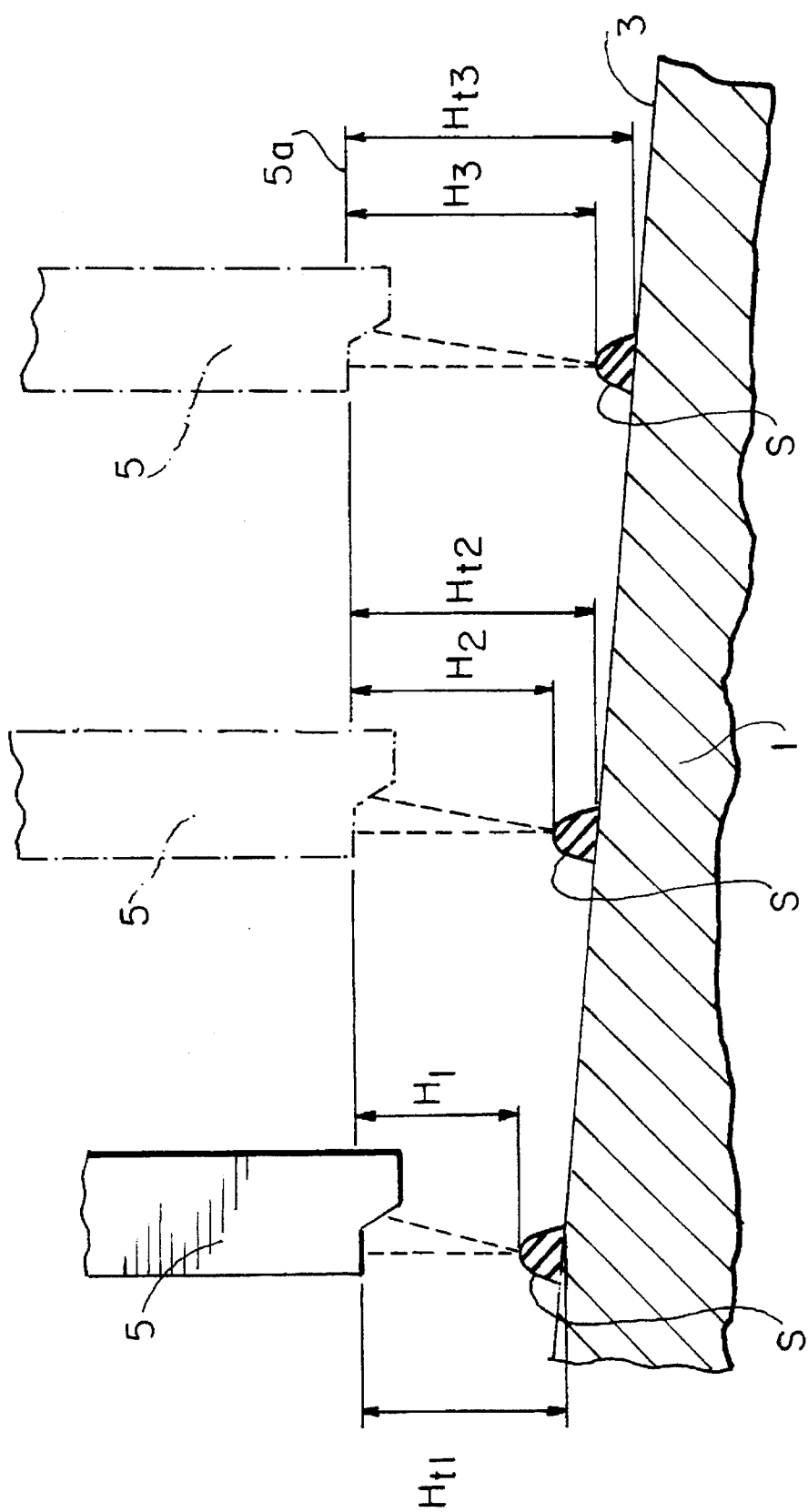

FIG. 5 relates to another embodiment in which the plane 5a of movement of the laser-meter head 5 (which is illustrated in three different positions) is inclined with respect to the plane of the laying surface 3 of the silicone string S. At each of the three illustrated positions, the thickness of the string is again determined as a difference between $H_t$ of the laser head 5 from the laying surface 3 and the distance (respectively indicated by $H_1$, $H_2$, $H_3$) of the laser head 5 form the top of the silicone string. This latter distance is determined by laser measurement, while the first distance, respectively indicated by $H_{t1}$, $H_{t2}$, $T_{t3}$ is determined preliminarly by computing the position in space of plane 3. This is also made by the laser head 5, by measuring the position in space of at least three points of such plane, so as to determine position and orientation with respect to the distance measuring apparatus.

Naturally, although the principle of the invention remains the same, the construction details and the embodiments may widely vary with respect to what has been described and illustrated purely by way of example, without departing from the scope of the present invention.

I claim:

1. A method for controlling the laying of a silicone string for sealing purposes between two elements, said method comprising:

locating one of the two elements in a position for receiving the silicon string, laying a silicone string on said one of said two elements, moving a robot with a laser-meter head for measuring distance by reflection with said laser-meter head adjacent to a laying surface of the silicone string, causing said laser-meter head to follow a predetermined path corresponding to a theoretical configuration of said string, processing output signals from said laser head during said movement of said laser-meter head for continuously measuring the thickness of said silicone string as a difference of the distances of said laser-meter head from said laying surface and from the top of said string, continuously checking, during said measuring, whether the thickness of said string as determined is between minimum and maximum predetermined values, wherein said laser-meter head is preliminarily used to determine a position in space of at least three points of a laying surface for the silicone string so as to enable a computation of a position in space of a plane containing all three points.

* * * * *